(No Model.)
W. STANLEY, Jr.
SELF EXCITING ALTERNATING CURRENT ELECTRIC GENERATOR.
No. 431,218. Patented July 1, 1890.
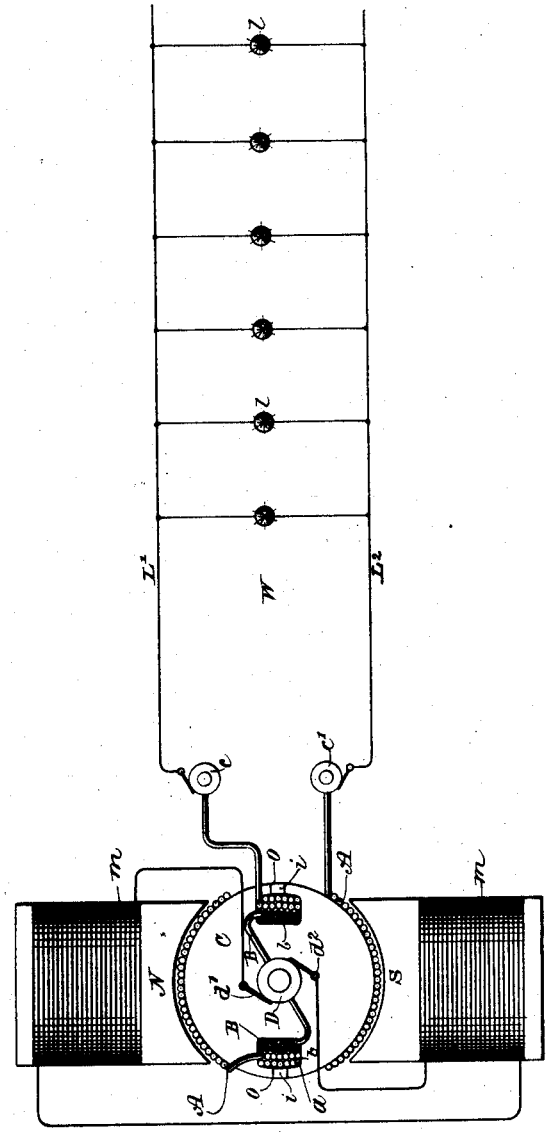
Witnesses:
Raphael Netter
J. T. Hood.
Inventor
William Stanley Jr.
By
Clarkson A. Collins
Attorney.

UNITED STATES PATENT OFFICE.

WILLIAM STANLEY, JR., OF GREAT BARRINGTON, MASSACHUSETTS.

SELF-EXCITING ALTERNATING-CURRENT ELECTRIC GENERATOR.

SPECIFICATION forming part of Letters Patent No. 431,218, dated July 1, 1890.

Application filed July 29, 1889. Renewed March 29, 1890. Serial No. 345,869. (No model.)

*To all whom it may concern:*

Be it known that I, WILLIAM STANLEY, Jr., a citizen of the United States, residing in Great Barrington, in the county of Berkshire and State of Massachusetts, have invented certain new and useful Improvements in Self-Exciting Alternating-Current Electric Generators, (Case No. 132,) of which the following is a specification.

The object of the invention is to automatically vary the potential of the current supplied to the field-magnet coils of such a generator in sympathy with variations in the current required to operate translating devices in a work-circuit supplied with current by the machine, so as to maintain a constant difference of potential between the terminals of the work-circuit. Such variation I primarily accomplish by increasing or decreasing, as the case may be, the number of effective lines of magnetic force threading certain of the armature-coils.

In carrying the invention into effect the armature of a dynamo-electric machine is wound with two coils or sets of coils, one of which supplies current to a work-circuit, while the current developed in the other coil or set of coils is redirected and used to excite the field-magnets of the machine. The armature is so constructed as to afford a path for the passage of a portion of the lines of force of the field outside of the armature-coils which supply current to the field-magnet coils, so that these coils are normally affected by only a portion of the field of force. The relative positions of the two sets of coils upon the armature-core are such that when a given exciting-coil is in a position of zero electro-motive force a corresponding coil of the other set which supplies current to the work-circuit is at or near the position in which maximum potential is induced in it. One or more turns of wire connected in series with the latter coil are wound adjacent to and parallel with the given exciting-coil. The terminals of the exciting-coil are connected to a commutator in order to supply current constant in direction for the proper excitation of the field-magnets, while the terminals of those coils which supply current to the work-circuit are connected to collector-rings in the usual manner.

The invention will be best understood by reference to the accompanying drawing, which is a diagram illustrating a cross-section of a dynamo constructed to operate in accordance with the invention.

Referring to the figure, N S represent the field-magnets of a dynamo having field-magnet coils $m$ $m$.

C is the armature-core, upon which are wound separate coils A and B. The coils A and B are wound at approximately right angles to one another, so that while one is in its position of zero electro-motive force the other is at or near that position of maximum induced electro-motive force. The armature-coil B is wound in recesses $b$ $b$ formed in the core C, into which the wires are introduced through openings $o$ $o$. After the wires are introduced into the recesses $b$ $b$ the openings $o$ $o$ are closed by plugs or strips of iron $i$, secured in the openings, or the recesses $b$ $b$ may be bored longitudinally through the core C, and the wires of the coils threaded back and forth therethrough. Thus a closed magnetic circuit is formed, giving passage to a portion of the lines of the field of force outside of the coil B. Parallel with the coil B and contained in the recess $b$ with it is wound a coil consisting of a few turns of wire $a$, connected in series with the coil A. The coil A is connected with the mains $L'$ $L^2$ of the work-circuit W by means of collector-rings $c$ $c'$, while the terminals of the coil B are connected with the field-magnet coils $m$ $m$ by means of a commutator D and brushes $d'$ $d^2$.

It is evident that as current flows in the coil $a$ a field of force will be set up around the wire, which will tend to change the direction of the adjacent lines of magnetic force in the field of the machine, and an increase of current in the coil $a$ will cause a greater or less number of lines of force to thread the coil B when it is in position of zero electro-motive force, according to the direction in which current is flowing in the wire $a$.

When translating devices are connected in parallel in the work-circuit, an increase in the number of translating devices in circuit causes a decrease in the difference of potential between the terminals of the coil A, supplying current to the work-circuit, and in order to keep the difference of potential constant an increased excitation of the field-magnets is necessary. The fall in potential is, however, accomplished by an increased flow of current, and more current flows through the coil $a$. The coil $a$ is so connected that the magnetic field, due to the flow of current through it, tends to drive inward the lines of force passing through the armature-core exterior to the coil B; hence upon an increase of current in the coil $a$ a greater number of lines of force will thread the coil B, thus increasing the potential developed in it as it rotates, and consequently increasing the excitation of the field-magnets and the difference of potential between the terminals of the coil A. Conversely upon a decrease in the flow of current in the coil $a$ more of the lines of force of the field will pass through the armature-core exterior to the coil B, and the potential in the coil will diminish with a corresponding diminution in the excitation of the field-magnets. If it is desired to produce the opposite effects—that is, to cause a decrease in the field strength upon an increase in the flow of current in the work-circuit, as, for example, when it is desired to maintain a constant current upon the work-circuit—the connections of the wire $a$ should be reversed so that the lines of the magnetic field set up by the current flowing through it will act in a direction to drive the lines of the field of force of the machine outward, thus decreasing the number of lines of force included in the coil B upon an increase in the flow of current in the wire $a$, and consequently decreasing the excitation of the field-magnets. It is evident that with each reversal of current in the coil $a$ the position of the coil itself will be reversed, and thus the lines of force developed by the current flowing in the coil $a$ will maintain a constant direction as related to the direction of the lines of force of the magnetic field of the machine.

For convenience of illustration, I have shown the machine as constructed with only two armature-coils, the one supplying the current to the work-circuit and the other to the field-magnet coils. In practice, however, it is desirable, for reasons well understood by those skilled in the art, that there should be two or more armature-coils in each set, the regulating-coils being arranged with reference to the field-supplying and work-supplying coils in the manner already shown.

While my invention is applicable to those dynamos which supply other than alternating currents for the operation of translating devices in the work-circuit, its especial advantage lies in the fact that by means of it a constant difference of potential or constant current value may be automatically maintained between the terminals of an alternating-current dynamo through great variations in the amount of load upon the work-circuit.

I have not attempted to describe herein all possible modifications of my invention, but only the best form now known to me, various modifications of which will readily occur to those skilled in the art; nor do I claim herein the method of operation herein described, as I have made it the subject of another application for Letters Patent.

What I do claim as new, and desire to secure by Letters Patent, is—

1. In a self-exciting alternate-current electric generator, the combination of two independent sets of armature-coils, the one set supplying current to the work-circuit and the other supplying current to excite the field-magnets of the generator, and a path for a portion of the lines of force of the magnetic field of the generator through the armature-core outside of the coils composing said second set, substantially as and for the purposes set forth.

2. In a self-exciting alternate-current electric generator, the combination of two independent sets of armature-coils and an armature-core providing a path for the passage of a portion of the lines of force of the magnetic field of the generator outside of the coils composing one of such sets of armature-coils, substantially as and for the purposes set forth.

3. In a self-exciting alternate-current electric generator, the combination of two independent sets of armature-coils, the one set supplying current to excite the field-magnets and the other set supplying current to the work-circuit, supplemental coils applied to the exciting-coils and receiving current from the coils supplying current to the work-circuit, and a path of low resistance for the passage of a portion of the field-lines of force through the armature and outside of the supplemental and exciting coils, substantially as set forth.

4. In the armature of a dynamo-electric machine, the combination of an armature-coil supplying current to the field-magnet coils, a closed magnetic circuit outside of such coil affording passage to a portion of the lines of force of the field, a second armature-coil supplying current to a work-circuit, and a supplemental coil applied to the first-named armature-coil and in circuit with the second armature-coil, substantially as set forth.

5. In the armature of a dynamo-electric machine, the combination of an armature-coil supplying current to the field-magnet coils, a closed magnetic circuit outside of such coil affording passage to a portion of the lines of force of the field, a second armature-coil supplying current to a work-circuit, and a supplemental coil in circuit with the coil supplying current to the work-circuit and so placed that the lines of force developed by current flowing therein shall control the passage of the field-lines of force through said magnetic circuit.

6. In a self-exciting alternate-current electric generator, the combination of an armature-coil supplying current to a work-circuit, a second armature-coil supplying current for the excitation of the field-magnets, a magnetic shunt for a portion of the field-lines of force outside of such second coil, and means for controlling the passage of the field-lines of force through such shunt, substantially as set forth.

In testimony whereof I have hereunto subscribed my name this 2d day of July, A. D. 1889.

WILLIAM STANLEY, JR.

Witnesses:
BENJAMIN BARKER, Jr.,
J. T. WOOD.